United States Patent [19]

DeGaeta et al.

[11] 4,357,756
[45] Nov. 9, 1982

[54] MAGNETIC COMPASS

[76] Inventors: Albert M. DeGaeta; Edythe C. DeGaeta, both of 10 Patriot Rd., Gladstone, N.J. 07934

[21] Appl. No.: 205,677

[22] Filed: Nov. 10, 1980

[51] Int. Cl.³ .................................................. G01C 17/06
[52] U.S. Cl. .................................. 33/355 R; 33/349; 308/35; 308/141
[58] Field of Search ..................... 33/355 R, 349, 352, 33/356, 357, 358, 359, 364; 308/35, 141, 190, 189 R

[56] References Cited

U.S. PATENT DOCUMENTS

| | | | |
|---|---|---|---|
| 1,056,544 | 3/1913 | Hoyt | 308/141 |
| 2,014,024 | 9/1935 | Leatherman | 33/349 |
| 2,487,044 | 11/1949 | Cude | 33/349 X |
| 2,878,578 | 3/1959 | Howard | 33/352 |
| 3,217,420 | 11/1965 | Dinsmore | 33/355 X |
| 3,588,001 | 6/1971 | Mitchell | 33/350 X |
| 4,260,204 | 4/1981 | Hirt et al. | 308/35 X |

Primary Examiner—William D. Martin, Jr.
Attorney, Agent, or Firm—Robert E. Burns; Emmanuel J. Lobato; Bruce L. Adams

[57] ABSTRACT

A magnetic compass comprises a case having a transparent cover and a magnetic compass card having a hub, which is rotatably supported on a central shaft projecting up from the base of the case by bearings comprising a thrust bearing between the hub and the upper end of the shaft and a radial bearing between the hub and a portion of the shaft spaced downwardly from the upper end. The radial bearing comprises a bearing ring set in a central recess in the hub and a full circle of small balls between the bearing ring and the shaft. In one embodiment there are two such radial bearings located one below the other. The bearings rotatably support the compass card on the shaft and retain it approximately perpendicular to the shaft even if the case is tilted.

14 Claims, 5 Drawing Figures

4,357,756

MAGNETIC COMPASS

FIELD OF INVENTION

The present invention relates to magnetic compasses and in particular those intended for marine use, and hand held compasses.

BACKGROUND OF THE INVENTION

A magnetic compass comprises a compass card rotatably supported in a closed case having a transparent cover through which the card can be viewed. One or more permanent magnets on the card cause it to rotate so as to orient the card relative to terrestrial magnetic lines of force. The case of the compass is customarily filled with liquid which exerts a damping action on the card and also imparts buoyancy to the card so as to reduce the effective weight of the card on its bearing. The compass card is customarily supported on the tapered upper end of a shaft projecting up from the base of the case by a central bearing in the card having a downwardly opening conical recess in which the tapered upper end of the shaft is received. A bearing of this kind allows the compass card to rotate freely in the case and also allows it to tilt relative to the axis of the supporting shaft. Tilting is limited by engagement of the compass card with the case, for example with the cover which is usually close to the compass card both to provide good visibility of the card and also to prevent the bearing of the card from becoming unseated from the upper end of the shaft.

When a compass is used on a boat and in particular on a sailboat, the compass is subject to tilting. For example, the compass may be tilted 20 degrees or more by the heeling of the sailboat. As the compass card is supported above its center of gravity, it tends to stay level and is hence tilted relative to the case when the entire compass is tilted. This may cause a peripheral portion of the compass card to engage the case—for example the cover—whereupon rotation of the compass card is impeded by frictional engagement with the case. The compass may hence give an inaccurate reading.

To avoid this undesirable effect, magnetic compasses are sometimes mounted on gimbals so that the compass remains substantially level despite pitching, rolling or heeling of the boat. However, gimbal mounting of the compass considerably increases its cost and also results in a considerably bulkier instrument which may be difficult to accommodate and mount on a boat.

SUMMARY OF THE INVENTION

It is an object of the present invention to avoid the above-mentioned disadvantages relative to magnetic compasses. In accordance with the invention, the compass card of a magnetic compass is mounted on a shaft projecting up from the bottom of the compass case by a bearing system comprising a thrust bearing which bears on the upper end of the shaft to support the compass card vertically and a radial bearing engaging the shaft below the upper end to position the card radially and to retain it approximately perpendicular to the shaft even when the compass as a whole is tilted. The radial bearing is an anti-friction bearing comprising an annular bearing race in the hub of the compass card and a circle of small rolling elements, for example balls, between such bearing race and the shaft.

With a bearing system of this kind, the compass card is prevented from tilting relative to the case so that frictional contact between the compass card and the case is avoided. Moreover, the bearing system provides low friction support for the compass card so that it can rotate freely in the case. There is thus provided a magnetic compass which is accurate in all conditions without the added expense and bulk of gimbal mounting.

BRIEF DESCRIPTION OF DRAWINGS

The nature, objects and advantages of the invention will be more fully understood from the following description of preferred embodiments shown by way of example in the accompanying drawings in which.

DESCRIPTION OF PREFERRED EMBODIMENTS

Figure 1:
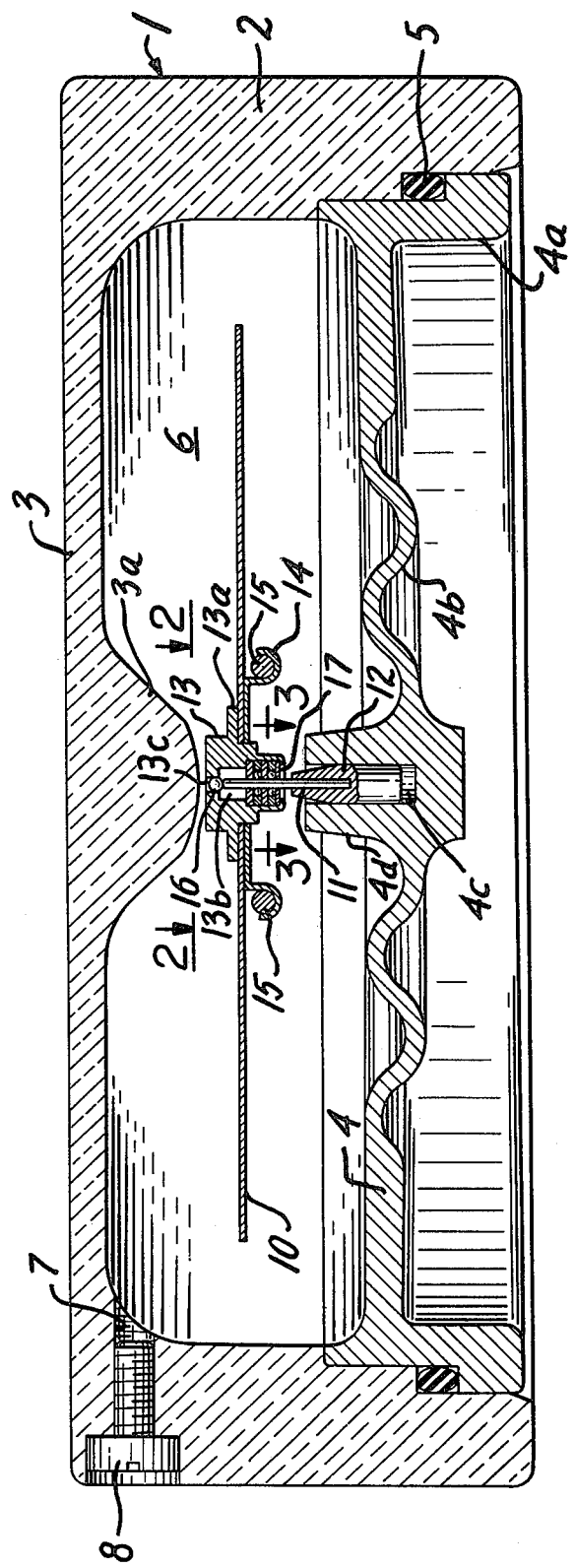
FIG. 1 is a somewhat schematic vertical cross section of a magnetic compass in accordance with the present invention.

As shown by way of example in the drawings, a magnetic compass in accordance with the present invention comprises a case 1 having a peripheral wall 2 and an upper wall or cover 3. At least the cover 3 is wholly or partially transparent so that a compass card in the case is visible through the cover. In the embodiment illustrated in FIG. 1, the peripheral wall 2 and cover 3 are molded integrally of transparent plastic material. A base or bottom 4 having a rim 4a is press-fitted into the bottom of the case. An annular gasket 5 provides a fluid-tight seal between the base 4 and the peripheral wall 2. The peripheral wall 2, cover 3 and base 4 define a hollow cavity 6 to accommodate a compass card. An opening 7 closed by a removable screw plug 8 is provided for filling the cavity 6 with a suitable liquid. The base 4 has concentric annular corrugations 4b providing a flexibility to accommodate thermal expansion or contraction of the liquid in the cavity 6.

A compass card 10 in the cavity 6 of the case is rotatably supported by a vertical shaft 11 which projects up from the center of the base 4. The shaft 11 is held by a bushing 12 which fits tightly into a recess 4c in an upwardly projecting central boss 4d on the base 4. The shaft 11 projects up into the cavity 6 with its upper end spaced downwardly from the cover 3.

The compass card 10 has a central hub 13 having an annular flange 13a to which the compass card is affixed. A bracket 14 fixed to the hub 13 carries two bar magnets 15 which in use orient the compass card 10 relative to terrestrial magnetic lines of force. The compass card 10 is provided on its upper face with appropriate indicia representing the points of the compass.

Figure 2:
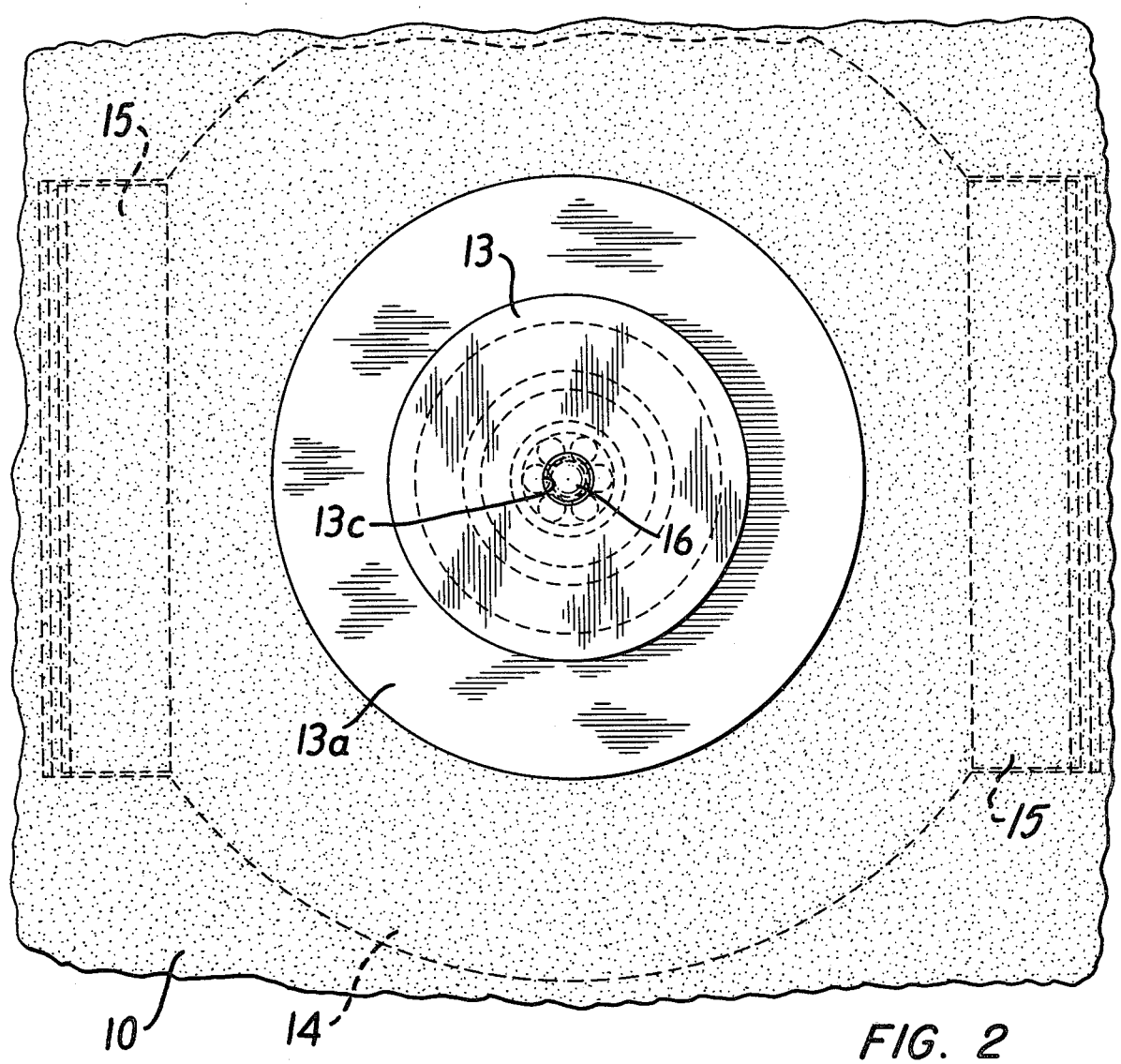
FIG. 2 is an enlarged schematic plan view of a central portion of the compass card as indicated by the line 2—2 in FIG. 1.

As illustrated by way of example in FIGS. 1 and 2, the compass card 10 is rotatably supported on the shaft 11 by a thrust bearing 16 and a radial bearing 17 accommodated in a central downwardly opening recess 13b in the hub 13. The thrust bearing 16 is shown in FIG. 1 as comprising a ball of hard strong durable material press-fitted into a central opening 13c in the top of the hub 13 and engaging the upper end of the shaft 11. The thrust bearing 16 supports the compass card vertically on the shaft 11 and thus takes the weight of the card other than that supported by the buoyancy of the card in the liquid filling the cavity 6. A rounded central boss 3a on the underside of the cover 3 projects downwardly so as to leave only a small clearance between the boss and the upper surface of the hub 13 of the compass card. The boss 3a does not normally engage the hub of the compass card but is close enough to prevent the card from being unseated from the shaft 11.

Figure 3:
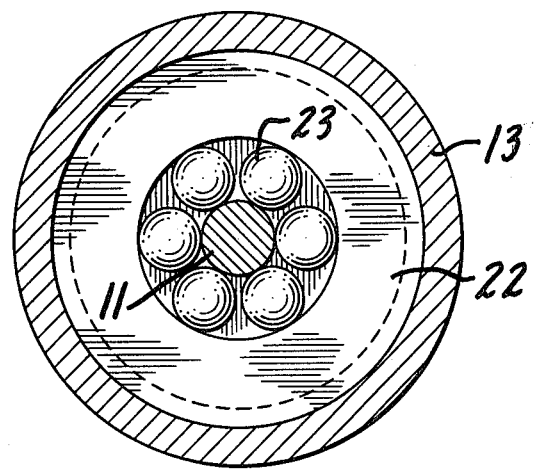
FIG. 3 is a horizontal cross section taken approximately on the line 3—3 in FIG. 1.

The radial bearing 17 will be described with reference to FIG. 4 where the same bearing is shown on a larger scale. It comprises an upper end plate 18 seated against a shoulder in the recess 13b of the hub 13, an intermediate plate 19 spaced downwardly from the upper end plate 18 and a lower end plate 20 spaced downwardly from the intermediate plate 19. The plates 18, 19 and 20 have central openings to accommodate the shaft 11. An upper bearing ring 21 is sandwiched between the upper end plate 18 and intermediate plate 19 while a lower bearing ring 22 is sandwiched between the intermediate plate 19 and lower end plate 20. Each of the bearing rings 20 and 21 has an inner diameter to accommodate bearing balls 23 between the respective bearing rings and the shaft 11. As seen in FIG. 3, there is a full complement of bearing balls 23 encircling the shaft 11. The balls 23 are received in an axial direction by the end plates 18, 20 and intermediate plate 19, there being no spider or cage for retaining the balls. The bearing assembly comprising end plates 18, 20, intermediate plate 19, bearing rings 21, 22 and balls 23 fits closely in the recess 13b of the hub 13 and is retained by an inturned lip 13d at the lower end of the recess.

Figure 4:
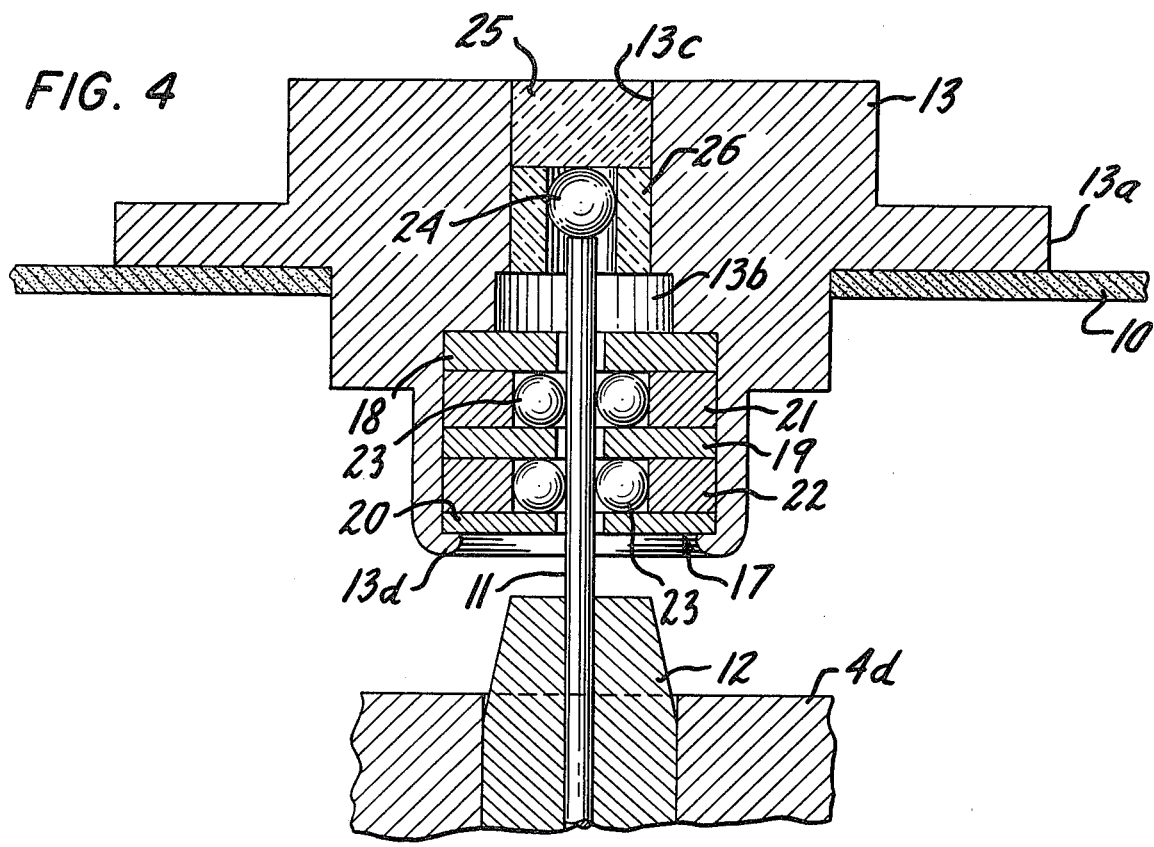
FIGS. 4 and 5 are enlarged vertical sectional views of bearing systems in accordance with the invention for supporting magnetic compass cards.

The thrust bearing shown in FIG. 4 comprises a ball 24 between the upper square end of shaft 11 and a bearing block 25 set in central aperture 13c at the upper end of the hub 13. A bearing ring 26 retains the ball 24 centered on the shaft 11. However, the ball 24 fits loosely in the bearing ring 26 so that it can turn freely. The bearing block 25 is preferably formed of hard durable low friction material such as saphire or corundum. The bearing ring 26 may be formed of the same material or of a suitable plastic, for example a low friction plastic material such as Teflon. The bearing block 25 and ring 26 are conveniently press-fitted into the central opening 13c of the hub 13.

It will be seen that the radial bearing 17 is in effect a dual bearing which not only positions the compass card radially but also maintains it approximately perpendicular to the shaft 11 thereby inhibiting tilting of the compass card relative to the casing. Thus frictional engagement of the compass card with the interior of the case is prevented.

An important factor contributing to low friction characteristics of bearings in accordance with the present invention is the high precision with which the bearing parts are made. The outer surface of the shaft 11 and the inner surface of the bearing rings 21 and 22 are precisely formed within a tolerance of the order of 30 millionths of an inch, the tolerance being measured as the difference between minimum and maximum radii measured from a fixed center to the bearing surface at different locations. The balls 23 are precisely spherical with a tolerance of the order of 3 millionths of an inch, the tolerance being the difference between minimum and maximum radii measured from a fixed center to different points on the surface of the ball. The surface finish of the balls, races, end plates 18, 20 and intermediate plate 19 is better than 4 micro inches R.M.S.

As will be seen in FIG. 3, there is a full complement of balls between the bearing race and the shaft 11, successive balls touching one another. There is no ball retainer or cage such as is commonly used in ball and roller bearings. The diameter of the balls is related to the inner diameter of the bearing rings 21 and 22 and the outer diameter of the shaft 11 so that the balls can turn freely but the accumulative clearance between the balls in a circumferential direction does not exceed a value of the order of 4 ten-thousands of an inch. With the clearance of this order of magnitude, the maximum radial movement of the shaft relative to the bearing rings is of the order of 100 to 200 millionths of an inch.

As will be seen from FIG. 4, the spacing between the end plates 18, 20 and intermediate plate 19 is determined by the axial dimension of the bearing rings 21, 22. This dimension should be slightly greater than the diameter of the balls so that the plates 18–20 do not impede the free movement of the balls in a circumferential direction but retain the balls in circular alignment with one another.

A further factor in reducing the friction of the ball bearing is the nature of the materials of which the ball bearing components are made. The balls and races are formed of hard strong durable material which can be formed accurately to predetermined dimension. Moreover, in order to obtain low friction values, the material of the balls and races should have a high modulus of elasticity. While it is preferable to use a material having a modulus of elasticity of 90 million p.s.i. or greater, it has been found that satisfactory results can be obtained with a material having a modulus of elasticity of the order of 30 million p.s.i. A satisfactory material has been found to be hardenable corrosion resistant steel, e.g. a high carbon chromium steel, having a modulus of elasticity of the order of 30 million p.s.i. and a compressive strength of the order of 250 to 350 thousand p.s.i.

The end plates 18, 20 and intermediate plate 19 do not need to have as high a modulus of elasticity as the races and balls but should preferably have a low coefficient of sliding friction. A satisfactory material for the end plates and intermediate plate has been found to be stainless steel having a modulus of elasticity of the order of 30 million p.s.i. and a compressive strength of about 75 to 125 thousand p.s.i. A preferred material for the intermediate and end plates is corundum having a modulus of elasticity of the order of 60 million p.s.i. and a compressive strength of about 300 thousand p.s.i. Corundum has the advantages that it is lighter than stainless steel and, in the thickness used, it is transparent so as to permit inspection of the balls after the bearing has been assembled. Its disadvantages are that it is more expensive than stainless steel and and less convenient to fabricate.

The number of balls used in the bearing can be varied according to the dimensions of the bearing. In order to hold the shaft at all times precisely centered, the number of balls should preferably not be less than 6. With the diameter of the outer race held constant, it has been found that the friction of the bearing can be decreased by increasing the number of balls. The upper limit is determined by the diameter of the balls which necessarily decreases as the number of balls increases. From the point of view of manufacture, it has been found desirable to use balls having a diameter of at least 0.01 inch.

The hub 13 which forms a housing for the bearing is formed of a material having a lower modulus of elasticity than that of the bearing rings, for example a modulus not exceeding at 30 million p.s.i. For example, suitable materials are brass having a modulus of elasticity of about 12 to 20 million p.s.i. and aluminum having a modulus of elasticity of about 10 million. Moreover, the hub 13 can, if desired, be molded of plastic material. The inner diameter of the recess 13b in which the bearing rings 20,22 are received is slightly less than the outer diameter of the bearing rings so that the rings are assembled in the hub with a press fit to assure that they are firmly held without play. When the lip or bead 13d is formed, the plates 18–20 and bearing rings 21,22 are held firmly between the lip and a shoulder in the recess 13b of the hub. As the modulus of elasticity of the material of the hub 13 is much lower than that of the bearing rings 21, 22, the latter are not distorted when assembled in the hub. With the construction shown and described, there is provided a bearing having extremely low friction characteristics thereby permitting free rotation of the compass card.

Figure 5:
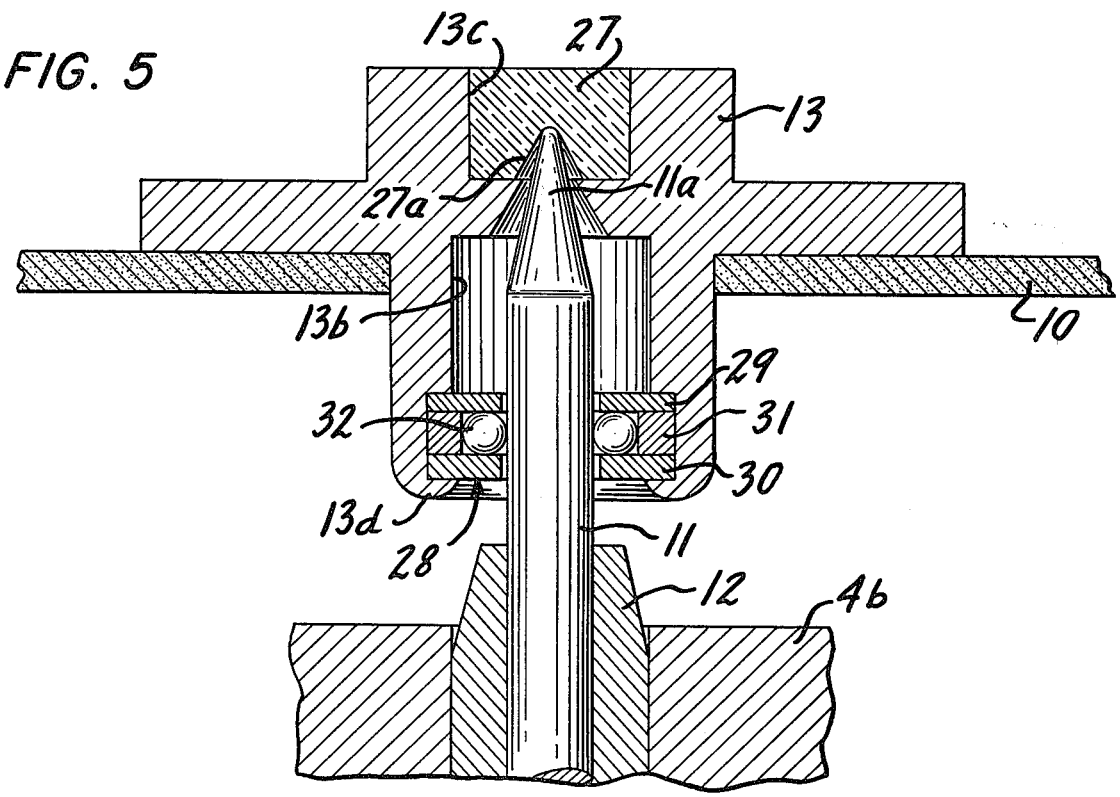

In the bearing system illustrated in FIG. 5, the upper end 11a of the shaft 11 is tapered to a slightly rounded point instead of being square as shown in FIGS. 1 and 4. The thrust bearing comprises a bearing block which is set in a central recess 13c at the top of the hub 13 and is provided on its lower face with a conical aperture 27a having its apex slightly rounded to conform with the small radius curvature at the upper end of the shaft 11. As in the embodiments of FIGS. 1 and 4, the shaft 11 is formed of hard durable material while the bearing block 17 is formed of hard low friction material such as saphire or corundum. A low friction bearing is thereby provided.

Radial bearing 28 is shown as comprising an upper end plate 29 set against a shoulder in a downwardly opening recess 13b of the hub 13 and a lower end plate 30 spaced axially downwardly from the upper end plate 29. A bearing ring 31 is sandwiched between the end plates 29, 30 and serves as a spacer between the end plates. A circle of balls 32 is provided between the bearing ring and the shaft 11 in the same manner as illustrated in FIG. 3. The bearing is retained in the recess 13b by an inturned lip 13d as described above. Except as otherwise shown and described, the radial bearing 28 of FIG. 5 is like that shown in FIG. 4.

It will be seen that FIG. 5 the bearing block 27 engaging the tapered upper end 11a of the shaft 11 cooperates with the radial bearing 28 to prevent the compass card from tilting relative to the shaft 11 and the case. The bearing system illustrated in FIG. 5 has an advantage in that it is less expensive to manufacture than that shown in FIG. 4.

While the anti-friction bearings shown in the drawings and described above are ball bearings, it will be understood that other rolling elements such as rollers or needles can be used instead of balls. However, ball bearings are preferred in that they can be manufactured economically with higher precision thereby attaining uniformly excellent low friction characteristics.

While preferred embodiments of the invention have been illustrated in the drawings and are herein particularly described, it will be understood that variations and modifications may be made. Thus the invention is not limited to the illustrated embodiments.

What is claimed is:

1. A magnetic compass comprising a case having a peripheral wall, a base and a transparent cover defining a card-receiving cavity, a fixed vertical shaft projecting up from said base centrally of said cavity and having an upper end below said cover, a compass card received in said cavity for rotation therein on said shaft, said compass card having a hub and magnetic means for orienting said card relative to terrestrial magnetic lines of force, and bearing means in said hub for rotatably supporting said card on said shaft, said bearing means comprising thrust bearing means engaging said upper end of said shaft to support said card vertically, and radial bearing means rotatably engaging said shaft below said upper end to position said card radially and to retain it approximately perpendicular to said shaft, said radial bearing means comprising an anti-friction bearing comprising an annular bearing race in said hub of said compass card formed of hard, strong, durable material and having a smooth circular cylindrical inner surface coaxially encircling and radially spaced from said shaft, a full circle of small precisely spherical balls of hard, strong, durable material between said bearing race and said shaft and flat annular end plates at opposite ends of said bearing race for retaining said balls in a circle, said balls being retained solely by said shaft, bearing race and end plates.

2. A magnetic compass comprising a case having a peripheral wall, a base and a transparent cover defining a card-receiving cavity, a fixed vertical shaft projecting up from said base centrally of said cavity and having an upper end below said cover, a compass card received in said cavity for rotation therein on said shaft, said compass card having a hub and magnetic means for orienting said card relative to terrestrial magnetic lines of force, and bearing means in said hub for rotatably supporting said card on said shaft, said bearing means comprising thrust bearing means rotatably engaging said shaft below said upper end to position said card radially and to retain it approximately perpendicular to said shaft, said radial bearing means comprising two anti-friction bearings disposed axially of one another on said shaft, each of said anti-friction bearings comprising an annular bearing race in said hub of said compass card formed of hard, strong, durable material and having a smooth circular cylindrical inner surface coaxially encircling and radially spaced from said shaft, a full circle of small precisely spherical balls of hard, strong, durable material between said bearing race and said shaft and flat annular end plates at opposite ends of said bearing race for retaining said balls in a circle, said balls being retained solely by said shaft, bearing race and end plates.

3. A magnetic compass according to claim 2, in which said hub of said compass card has a central bearing surface facing the upper end of said shaft and in which said thrust bearing means comprises a ball of hard, strong, durable material between said central bearing surface of said hub and the upper end of said shaft and means retaining said ball centered between said central bearing surface of said hub and the upper end of said shaft.

4. A magnetic compass according to claim 3, in which said hub has a central inert of hard, low-friction material having a lower face which forms said central bearing surface of said hub.

5. A magnetic compass according to claim 1, in which the upper end of said shaft is tapered to an apex, and in which said thrust bearing means comprises a central insert in said hub of said compass card having a downwardly opening recess which receives said tapered upper end of said shaft.

6. A magnetic compass according to claim 2, in which said bearing races and end plates are disposed contiguously in an axial sequence of a first end plate, a first bearing race, a second end plate, a second bearing race and a third end plate, one circle of said balls being retained between said first and second end plates and a second circle of said balls being retained between said second and third end plates.

7. A magnetic compass according to claim 1, in which said bearing race has flat end surfaces and is sandwiched between said end plates, said bearing race thereby precisely spacing said end plates from one another.

8. A magnetic compass according to claim 1 or claim 2, in which said hub of said compass card has a central downwardly recess in which said radial bearing means is housed, said hub having an inturned lower end portion to secure said radial bearing means in said recess.

9. A magnetic compass according to claim 1, in which the material of said race and balls has a modulus of elasticity of at least 30 million p.s.i. and a compressive strength of the order of 250 and 350 thousand p.s.i.

10. A magnetic compass according to claim 9, in which said end plates are formed of a material having a modulus of elasticity of the order of 30 to 60 million p.s.i. and a compressive strength of the order of 0.75 to 300 thousand p.s.i.

11. A magnetic compass comprising a case having a peripheral wall, a base and a transparent cover defining a card-receiving cavity, a vertical shaft projecting up from the base central of said cavity and having a pointed upper end below said cover, a balanced compass card received in said cavity for rotation therein on said shaft, said compass card having a hub with a central downwardly opening recess and magnetic means mounted on said hub for orienting said card to terrestrial magnetic lines of force, and bearing means in said hub for rotatably supporting said card on said shaft, said bearing means comprising a bearing block of hard low-friction material set in an upper portion of said hub and having on its lower side a cavity receiving said pointed upper end of said shaft and anti-friction radial bearing means rotatably engaging the shaft below the upper end, said radial bearing means comprising axially spaced flat annular end plates set tightly in said recess of said hub, a bearing ring of hard, strong, durable material sandwiched between said end plates and having a circular cylindrical bearing surface uniformly spaced radially from said shaft and a full circle of small precisely spherical balls of hard, strong, durable material between said end plates and between said bearing ring and said shaft, said bearing rings being of material having a substantially higher modulus of elasticity than material of said hub.

12. A magnetic compass comprising a case having a peripheral wall, a base and a transparent cover defining a card-receiving cavity, a vertical shaft projecting up from the base centrally of said cavity and having an upper end below said cover, a balanced compass card received in said cavity for rotation therein on said shaft, said compass card having a hub with a central downwardly opening recess and magnetic means mounted on said hub for orienting said card to torrestrial lines of force, and bearing means in said hub for rotatably supporting said card on said shaft, said bearing means comprising thrust bearing means in an upper portion of said hub engaging the upper end of said shaft to support said card vertically, and anti-friction radial bearing means set in said recess of said hub and rotatably engaging said shaft below its upper end, said radial bearing means comprising in sequence a first flat annular end plate, a first bearing ring set against said first end plate, a second flat annular end plate set against said first bearing ring, a second like bearing ring set against said second end plate and a third like flat annular end plate set against said second bearing ring, a first full circle of small balls between said first bearing ring and said shaft and between said first and second end rings and a second full circle of small balls between said second bearing ring and said shaft and between said second and third end rings, said hub closely confining said end plates and bearing rings to hold them in assembled rotation, said shaft, end plates, bearing rings and balls being of hard, strong, durable material and said hub being of material having a modulus of elasticity substantially lower than that of the material of said bearing rings and end plates.

13. A magnetic compass according to claim 11 or 12, in which said bearing rings and ball are of material having a modulus of elasticity of at least 30 million p.s.i. and said hub is of material having a modulus of elasticity less than 30 million p.s.i.

14. A magnetic compass according to claim 12, in which said thrust bearing comprises a bearing block set centrally in an upper portion of said hub, a single ball between said bearing block and the upper end of said shaft and a bearing ring of low friction material loosely surrounding said ball to retain it centered with the shaft while permitting it to turn freely.

* * * * *